Patented May 10, 1927.

1,628,280

UNITED STATES PATENT OFFICE.

MAXIMILIAN PAUL SCHMIDT AND WILHELM NEUGEBAUER, OF BIEBRICH-ON-THE-RHINE, GERMANY, ASSIGNORS, BY MESNE ASSIGNMENTS, TO GRASSELLI DYE-STUFF CORPORATION, OF NEW YORK, N. Y., A CORPORATION OF DELAWARE.

PROCESS FOR PREPARING NITRILES OF THE BENZANTHRONE SERIES.

No Drawing. Application filed February 23, 1926, Serial No. 90,205, and in Germany November 17, 1924.

We have found that by the action of cuprous cyanide upon halogenated benzanthrones the halogen is replaced by the cyanogen group whereby nitriles of the benzanthrones are formed which on fusing with alkaline agents are transformed into valuable vat dyestuffs. For instance, by reacting cuprous cyanide on Bz-1-halogen-benzanthrone, Bz-1-cyanbenzanthrone of the following formula is produced:

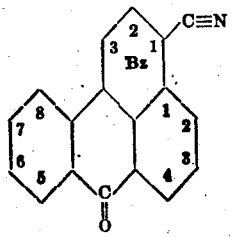

Although it is known that in simple compounds, such as chlornaphthalene the halogen can be exchanged for the cyanogen group, it could not be foreseen that such a reaction would also occur with halogenated ketones of higher molecular weight, such as halogenbenzanthrones. For, the said reaction fails when poly-halogenated naphthalenes, such for instance as 1:5-dichlornaphthalene, are used. Moreover the reaction between halogenated benzene derivatives and cyanides fails to produce any good result. However the replacement of the halogen in the halogenated benzanthrones takes place with a good yield.

The reaction may be conducted by melting the halogenated benzanthrones with cuprous cyanides either in a direct way or by heating in solvents of high boiling points.

*Examples.*

(1) 8 parts by weight of mono-bromobenzanthrone (obtained by the process described in German Patent Nr. 193,959) are mixed with 2.6 parts of cuprous cyanide and this mixture is heated for some hours to about 200–210° C. There is at first obtained a melt of a brownish color which after some time solidifies.

The cyanobenzanthrone can be extracted from the comminuted crude product for instance by hot nitrobenzene, from which it crystallizes on cooling in the form of thin needles of a faint greenish color. In case of need any unconverted bromobenzanthrone may be previously eliminated by boiling it with glacial acetic acid.

The cyanobenzanthrone is insoluble in alkalies and acids. Its solution is concentrated sulfuric acid shows an orange color with a like fluorescence. It is difficultly soluble in alcohol, glacial acetic acid and benzene, more readily soluble in pyridine, chlorobenzene and nitrobenzene and has its melting point at 243–244° C.

As we have furthermore found, the cyanobenzanthrones when melted with alkalis, for instance with a caustic alkali or with sodium amide, are converted into valuable dark bluish-violet vat dyestuffs.

(2) 31 parts by weight of brombenzanthrone of melting point 170° C. (see German Patent Nr. 193,959), 11 parts of cuprous cyanide and 200 parts of pyridine are heated together for about 25 hours to 150° C. The mass is then diluted with ammonia, filtered by suction and washed with water. In order to increase its purity the product may be sublimed or recrystallized for instance from nitrobenzene; it is identical with the product obtained according to Example 1 be heating bromobenzanthrone directly with cuprous cyanide.

The above mentioned temperatures may be raised or lowered within wide limits without altering the result, for instance the bromobenzanthrone may also be converted into the cyanogen compound by boiling it for a prolonged time with cuprous cyanide in pyridine without using any presseure.

(3) 38 parts by weight of dibromobenzanthrone of melting point 257° C. (see German Patent Nr. 193,959) are heated for 20 hours to about 160° C. with 20 parts of cuprous cyanide in 250 parts of pyridine. The mixture resulting from the reaction is then diluted with ammonia, filtered by suction, washed with water and dried. In order to purify it, the product may be recrystallized from nitrobenzene. In this manner yellow crystals are obtained the analysis of which shows that they constitute a dicyanobenzanthrone. The crystals melt at above 310° C., their solution in concentrated sulfuric acid is of a yellow color with an intense yellowish-green fluorescence. The product is difficultly soluble in most of the organic solvents.

We claim:

1. Process of producing nitriles of the benzanthrone series consisting in causing cuprous cyanide to act upon a halogenated benzanthrone.

2. Process of producing nitriles of the benzanthrone series consisting in causing cuprous cyanide to act upon a Bz-1-halogen-benzanthrone.

3. As a new product, dicyanobenzanthrone.

In testimony whereof we hereunto affix our signatures.

MAXIMILIAN PAUL SCHMIDT.
WILHELM NEUGEBAUER.